(No Model.)

A. KELLEY.
ARTIFICIAL FISH FOR BAIT.

No. 538,169. Patented Apr. 23, 1895.

Witnesses:
J. C. DeCoster
E. B. Arnold

Inventor:
Albert Kelley
per Eugene Humphrey
his Atty.

UNITED STATES PATENT OFFICE.

ALBERT KELLEY, OF BOSTON, MASSACHUSETTS.

ARTIFICIAL FISH FOR BAIT.

SPECIFICATION forming part of Letters Patent No. 538,169, dated April 23, 1895.

Application filed May 2, 1894. Serial No. 509,796. (No model.)

*To all whom it may concern:*

Be it known that I, ALBERT KELLEY, of Boston, in the county of Suffolk and State of Massachusetts, have invented a new and useful Improvement in Artificial Fish for Bait, which will, in connection with the accompanying drawings, be hereinafter fully described, and specifically defined in the appended claims.

My invention relates to improvements in artificial fish used for bait, and in the method of mounting the hooks thereon, such imitation fish being usually composed of metallic or rubber bodies, and having hooks attached to them by means of short lines of catgut or other suitable fiber.

Figure 1:
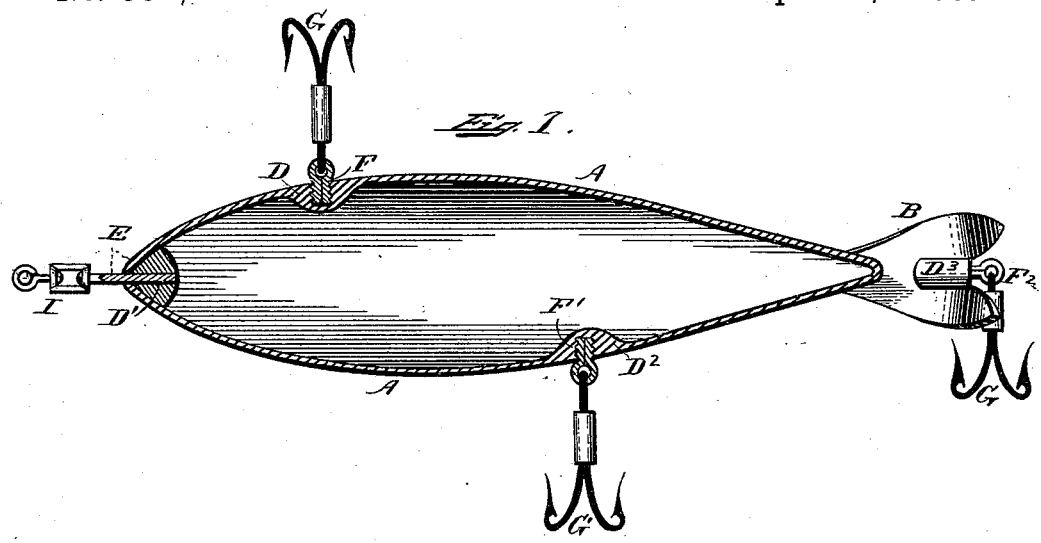
Figure 2:
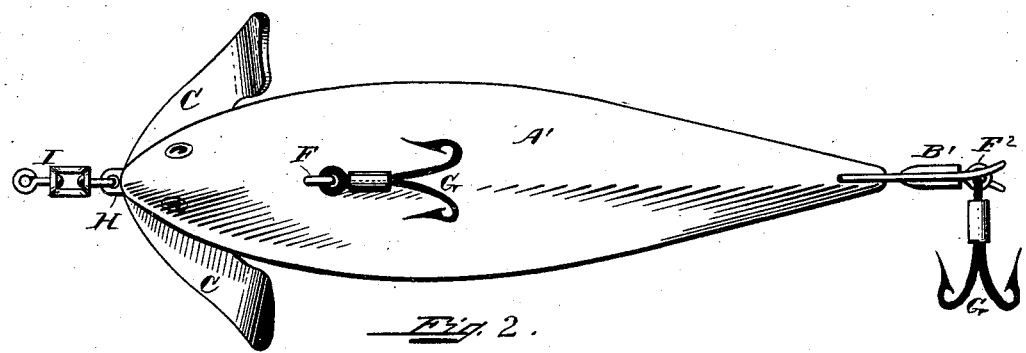

In the drawings: Figure 1 is a longitudinal section of an artificial fish the body of which is composed of a metallic shell, and shows my improved construction and method of mounting the hooks thereon. Fig. 2 is a plan or top view of Fig. 1.

Referring to Fig. 1, A indicates the metallic shell of the hollow body of said fish bait; B, the metallic tail bent so as to cause the fish to revolve or spin about its axis by the action of the water thereon, thus simulating animation in the bait, when trolled in the water, or held in a current. It may also have a spinner C as shown in Fig. 2. In accordance with my improved construction the interior of the shell is thickened at $D$, $D'$, $D^2$, $D^3$ to receive the line-swivel E, and the split hook-screws F, F' and $F^2$, into the eyes of which the eyes of the hooks G, G', and $G^2$ are passed by opening the split, after which the screws are turned into the threaded parts D of the body as shown. This substitution of an exclusively metallic mounting for the usual fibrous mounting of the hooks, and adaptation of the bait to receive the same, constitutes the essential feature of my invention. This metallic mounting is stronger and less liable to break or get out of place than the said fibrous mountings. In case a hook-screw breaks, it is easy to replace it with a new one, a sufficient number of which for that purpose may be conveniently carried in the pocket.

I claim—

1. An artificial fish bait comprising an imitation-fish body having threaded openings suitably arranged therein; a number of split hook-screws threaded into said openings; and hooks held in the eyes of said screws and thereby secured to the body, constituting a wholly metallic mounting of the hooks, all substantially as specified.

2. An artificial fish, for bait, composed of a metallic shell A, having its interior wall thickened as at D and D', and provided with a number of hooks attached thereto by means of split screws F and F' threaded into the shell, substantially as and for the purposes specified.

ALBERT KELLEY.

Witnesses:
EUGENE HUMPHREY,
J. C. DE COSTER.